Jan. 29, 1957 L. E. HYDE 2,779,058
MOLD FOR MAKING IMITATION ARTICLE
Filed Aug. 26, 1952 2 Sheets-Sheet 1
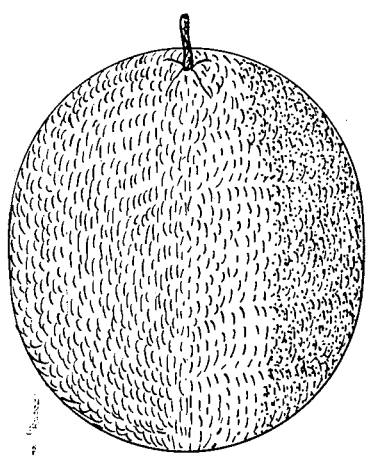
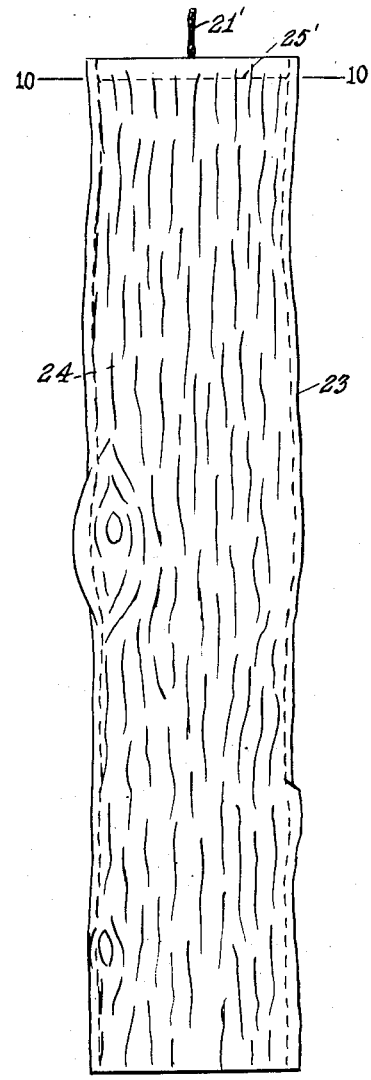
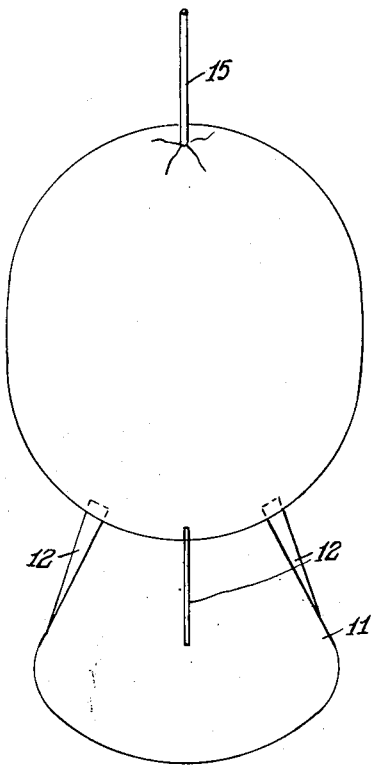
INVENTOR.
LAURIN E. HYDE
BY
ATTORNEY

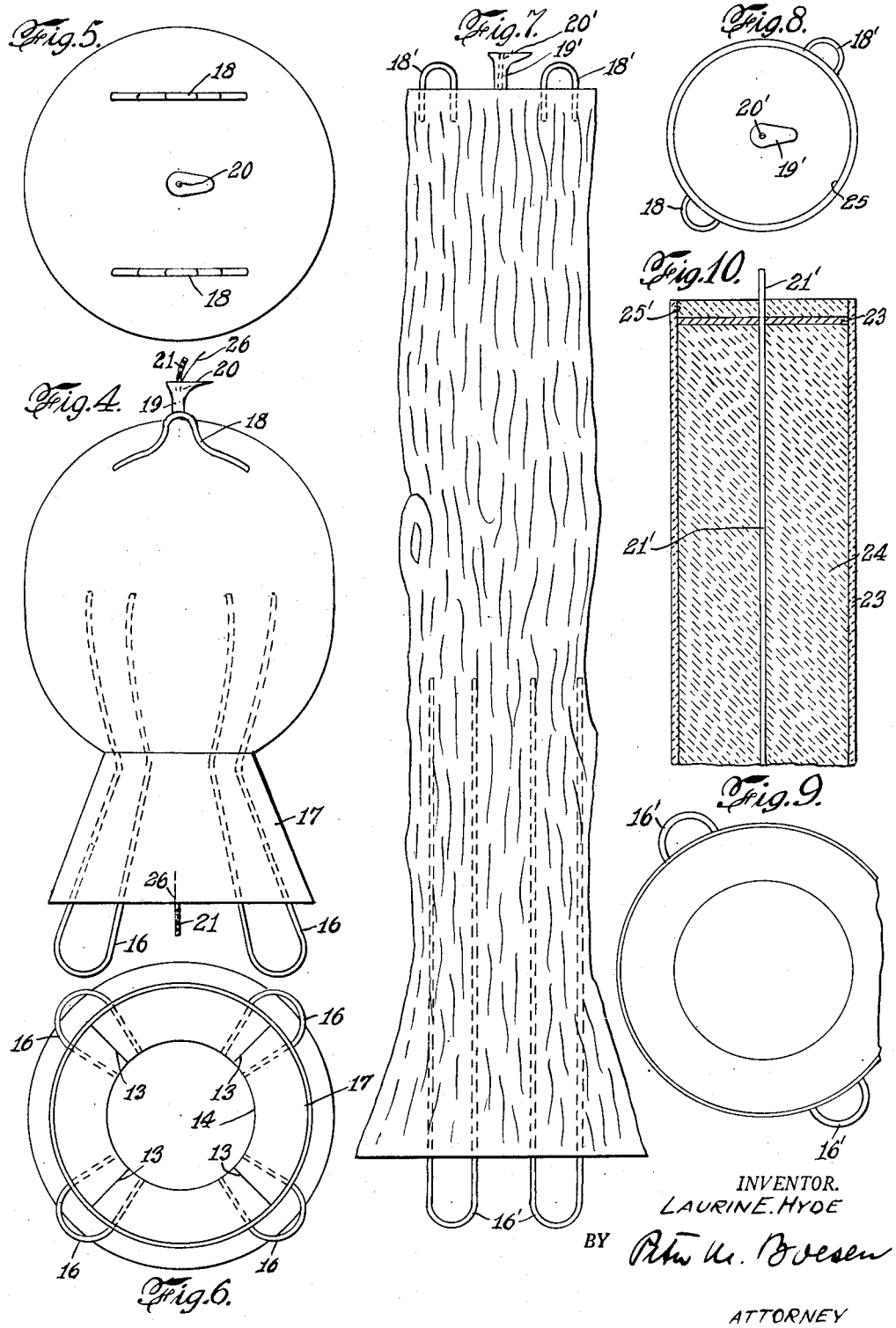

2,779,058

MOLD FOR MAKING IMITATION ARTICLE

Laurin E. Hyde, New York, N. Y.

Application August 26, 1952, Serial No. 306,461

1 Claim. (Cl. 18—27)

This invention has for its purpose to provide imitations of objects in such a manner that a natural likeness is produced.

As an illustration of some of the imitated objects, or articles, made, are here shown, an orange, and part of a tree stem, which both are adapted to be used as candles.

With the above and other objects in view, this invention consists of the novel features of construction, combination and arrangement of parts, hereinafter fully described, claimed and illustrated in the accompanying drawings, forming part of this application, and in which similar characters of reference indicate corresponding parts in all views, and in which:

Figure 1 shows in perspective an orange, serving the purpose of a candle, and made according to my invention.

Figure 2 shows, also, in perspective an orange mounted on a cone, for the purpose of making a mold from this combination.

Figure 3 shows in side elevation part of a tree stem, also serving the purpose of a candle.

Figure 4 shows in side elevation a mold for making said orange.

Figure 5 is a top view of Figure 4; and

Figure 6 is a bottom, or end view thereof.

Figure 7 shows in side elevation a mold for making said tree stem.

Figure 8 is a top plan view of Figure 7; while

Figure 9 is a bottom, or end view thereof, and

Figure 10 is a transverse sectional view, taken on the line 10—10 of Figure 3.

Referring more particularly to the drawings, the imitation orange shown in Figure 1 is made by means of a mold shown in Figures 4, 5 and 6; the said mold is, in turn, made from a model of any suitable material, and especially shown in Figure 2.

The said model shown in Figure 2 comprises the shape of an orange arranged on a cone-shaped base 11; strips of thin material 12 are secured to the base 11, for instance, by inserting these into slits made in the base and extending slightly in to the orange mounted upon the latter.

The said strips serve the purpose, when a mold is formed upon the model shown in Figure 2, to provide slits 13 in the mouth, or funnel-shaped opening, or outlet, 14 of said mold, so as to facilitate the extraction, or removal, of an imitation orange from the mold after the latter has been filled with molten wax, as the slits in the base 17 surrounding the outlet 14 permit an extension of said base.

The pin 15 vertically arranged in the model, Figure 2, serves to provide space for a wick in the mold of an imitation orange and to keep said wick in an upright and centered position, when the mold is filled with wax.

Straps 16, that may be of cord, are secured to the base 17 surrounding the outlet 14, and extend far into the wall of the orange-shaped part of the mold, or about to the middle thereof, as shown in Figure 4 of the drawings.

The said straps 16 facilitate the handling of the mold, when this is being filled with molten wax; they also facilitate the folding back of the base 17 around the outlet 14, as an aid in removing the finished specimen of the orange formed; the said straps further serve to strengthen the structure of the wall of the mold.

An additional object of the straps is to support the mold, when this is hung up after being filled with molten wax, to be cooled off, by being submerged in water.

The purpose of submerging the filled mold in water is also to stabilize the internal pressure relative to the external pressure during said process.

Additional straps 18 are arranged at the opposite end of the mold, as shown in Figure 4, for the purpose of attaching a weight (not shown) to the mold to permit the submerging in water of the latter.

However, instead of attaching a weight to the end of the mold, the latter may have its end weighted by imparting, or including some heavy material in any form to the said end to become an integral part of the wall of the mold.

A rubber neck portion 19, serving the purpose of sealing the outlet 20 for a wick, is arranged, or formed, at the top of the mold; said neck portion has a small orifice 20 therein for the insertion of said wick guided by a wire 26, as shown in Figure 4.

The wick may, however, if desired, be hollow so as to receive said pin.

It is obvious, that by pouring melted wax into the mold, nothing will flow out through the orifice 20, as the rubber of the mold will contract closely around said wick and wire in the neck portion.

In Figures 7, 8 and 9 is shown a mold for making, for instance, in wax, part of a tree stem, as illustrated in Figure 3, and also used as a candle.

The said mold has an oblong hollow body portion, also made of rubber, and with straps for the purposes formerly described, and indicated by the numerals 16' and 18'.

While said mold also has a neck portion 19' formed with an orifice 20' to accommodate a wick 21', the said mold is made with a depression 25 at one end thereof, as shown in Figures 3 and 8, for the purpose hereinafter described.

In making a candle imitating a tree stem, the mold is first filled with a molten wax having the color of the bark of the tree it is desired to imitate.

While the wax is still in molten condition, the mold is turned upside down so that the wax flows out, leaving just enough in the mold upon the wall of the latter to form the imitated bark, indicated in Figure 3 by dotted lines 23.

The mold is then next filled with a different kind of molten wax, as may be desired, and which constitutes the inner solid core 24 of the imitated tree stem.

Provision is made in a similar manner as before stated for the insertion of a wick 21' by means of a neck 19', and the cooling off process is also carried out in a similar way.

However, as the second process would naturally, in performing the first step thereof, leave a bark crust not only at the side of the tree stem, but also at the top of the latter, the mold, shown for this second process, has been made wih a central depression 25 at the top, so that when the finished tree stem is extracted from the mold, there would be a corresponding depression 25' at the top of the tree stem, which depression may then be filled separately with a wax corresponding to that of the interior of the imitated tree stem, so as to provide a true imitation of a tree stem above and below the latter, as well as in regard to the side thereof.

It is obvious that changes may be made in the form, construction and arrangement of the several parts, as shown, within the scope of the appended claim, without departing from the spirit of the invention, and I do not, therefore, wish to limit myself to the exact construction shown and described herein.

What I claim as new, and desire to secure by Letters Patent of the United States is:

A mold for making an imitation orange comprising a hollow orange shaped member and a cone-shaped base integral with the latter, straps secured to the bottom and top of said mold, said mold being provided with an outlet at its top, a rubber neck portion having a small orifice posed in said orifice, and a pin for guiding said wick in the insertion thereof in a mold, said base being formed with slits, whereby to facilitate the extraction of the imitation orange from the mold.

References Cited in the file of this patent

UNITED STATES PATENTS

| | | |
|---|---|---|
| 26,429 | Halvorson | Dec. 13, 1859 |
| 2,122,451 | Cassimatis | July 5, 1938 |
| 2,124,871 | Beal | July 26, 1938 |
| 2,196,258 | Erdle | Apr. 9, 1940 |
| 2,308,738 | Baur | Jan. 19, 1943 |
| 2,435,285 | Lucia | Feb. 3, 1948 |